United States Patent [19]
Braun

[11] 3,792,869
[45] Feb. 19, 1974

[54] HYDRAULIC CHUCK

[75] Inventor: Leonard A. Braun, St. Paul, Minn.

[73] Assignee: Longyear Company, Minneapolis, Minn.

[22] Filed: Nov. 13, 1972

[21] Appl. No.: 306,015

[52] U.S. Cl............ 279/4, 279/121, 81/57.18, 81/57.19, 173/149, 408/234
[51] Int. Cl............................. B23b 31/40
[58] Field of Search........ 279/4, 121, 122; 173/149; 408/234, 238; 81/57.18, 57.19

[56] References Cited
UNITED STATES PATENTS

| | | | |
|---|---|---|---|
| 3,451,314 | 6/1969 | Smrekar | 279/4 X |
| 3,083,025 | 3/1963 | Heibkersman | 279/4 X |
| 2,768,830 | 10/1956 | Janson | 279/121 X |

*Primary Examiner*—Gil Weidenfeld
*Attorney, Agent, or Firm*—Dugger, Johnson & Westman

[57] ABSTRACT

Chuck apparatus mounted on a drive gear housing and a tubular drive spindle extended downwardly through the drive gear housing that includes a plurality of chuck jaws radially slidably extended through slots in the spindle, an annular retainer ring bolted to the spindle to aid in mounting the jaws, an annular jaw actuator mounted on the spindle for axial movement relative thereto, a chuck housing supporting the actuator for rotary movement relative thereto and moving the actuator upwardly, bearings for transmitting a downward force from the chuck housing to the actuator, piston cylinder combinations dependingly mounted on the drive gear housing and in turn mounting the chuck housing, said combinations being operable for moving the chuck housing axially relative the spindle, and springs for resiliently urging the jaws radially outwardly.

10 Claims, 2 Drawing Figures

3,792,869

1

HYDRAULIC CHUCK

BACKGROUND OF THE INVENTION

Chuck apparatus for gripping engaging a drive rod and having jaws radially movable between rod clamping and rod unclamping positions. In the prior art, for example, U. S. Pat. No. 2,768,830, there is provided a hydraulic chuck, however, such a chuck is of a relatively complex construction and all of the downward drilling force is exerted through the chuck body. U.S. Pat. No. 2,684,857 to Chrimacker discloses a mechanical chuck, but the chuck is subject to disadvantages such as those mentioned above relative to U.S. Pat. No. 2,768,830. In order to overcome problems such as the above, as well as others, this invention has been made.

SUMMARY OF THE INVENTION

Chuck apparatus dependingly mounted on a drive housing that includes a vertical tubular drive member rotatably mounted by the housing and having a lower chuck body portion below the housing that mounts a jaw for radial movement, an annular actuator mounted on the chuck body portion for axial movement to move the jaw inwardly, an annular mounting member mounting the actuator for rotary movement relative thereto and exerting a downward force on the actuator, and power means mounted on the housing for mounting the mounting member and selectively moving the mounting member toward and away from the housing.

One of the objects of this invention is to provide in chuck apparatus mounted on a housing, new and novel mechanism for mounting a jaw actuator and transmitting a downward force directly from the housing to the actuator and thereby to the jaw. Another object of this invention is to provide new and novel chuck apparatus that is of a relatively simple construction and transmits a downward force to the jaws through other than the chuck body on which the jaws are mounted for radial movement.

BRIEF DESCRIPTION OF THE DRAWINGS

Referring to FIGS. 1 and 2, there is illustrated the lower end portion of a drive spindle, generally designated 11, that is extended through a drill head having the drill head housing 12 to have the chuck body portion thereof located beneath the drill head housing. The drive spindle is mounted in the housing in a fixed axial position relative thereto for rotary movement, the drill head including conventional mechanism (not shown) for drivingly rotating the spindle relative the housing. The spindle in part is mounted by the housing by a bearing 13 having an outer race bearing against an upwardly facing shoulder in the housing bottom wall 12a and an inner race bearing against a spacer 14 that in turn bears against an upwardly facing shoulder on the drive spindle. A seal 15 is mounted by wall 12a to surround spacer 14. A second bearing 13 is mounted in the housing to have an outer race bear against a downwardly facing shoulder of the housing top wall (not shown) and an inner race to bear against a spacer 14 which in turn bears against a downwardly facing shoulder (not shown) on the upper portion of the spindle, the last mentioned shoulder being vertically above the last mentioned spacer. One example of suitable structure for mounting the drill head and moving the drill head for exerting a downward or a withdrawal force to the drill head is shown in the copending application of Jamshed Rustom Cooper, U. S. Pat. No. 306,016, filed the same day as this application and assigned the same assignee as this application.

Figure 1:
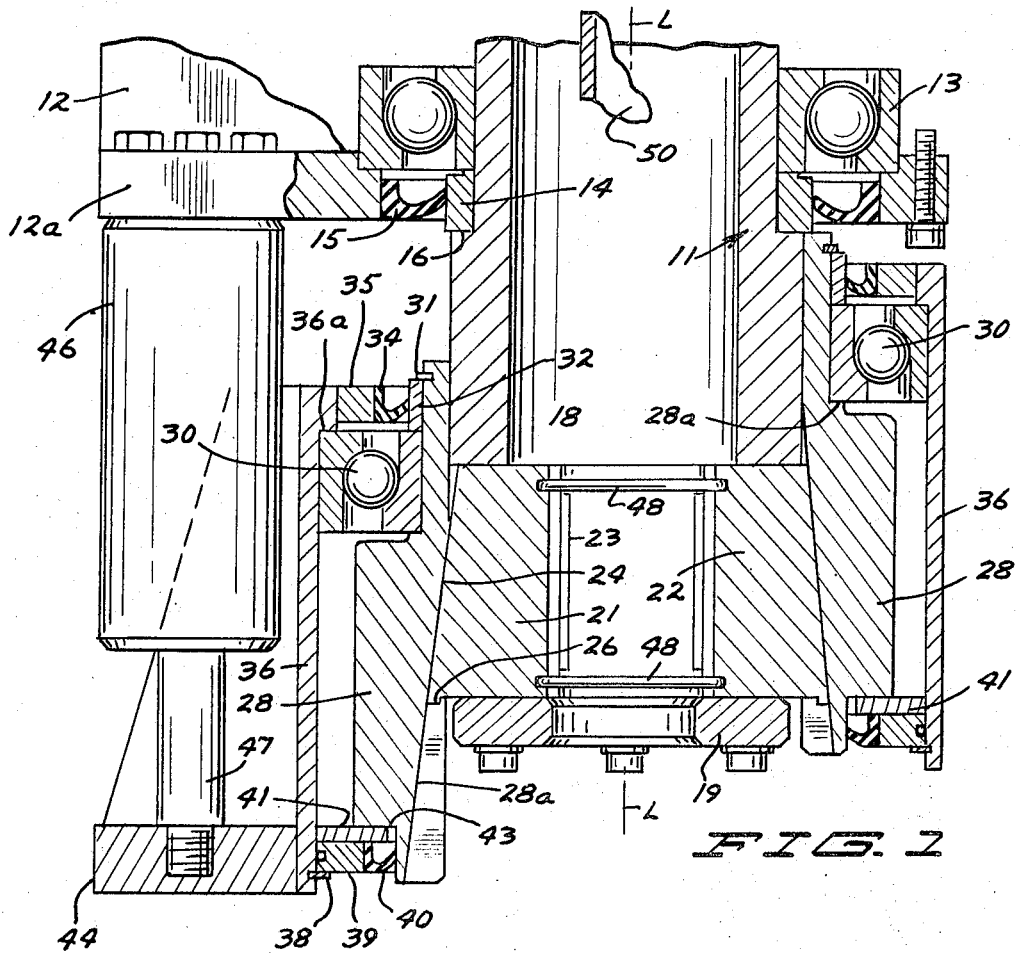
FIG. 1 is a fragmentary view, part in cross section, of the chuck apparatus of this invention, said view being generally taken along the line and in the direction of the arrows 1—1 of FIG. 2 and to the left of the central axis L—L showing the apparatus in a drill rod clamping position, and to the right of said axis, showing the apparatus in the drill rod release position.
Figure 2:
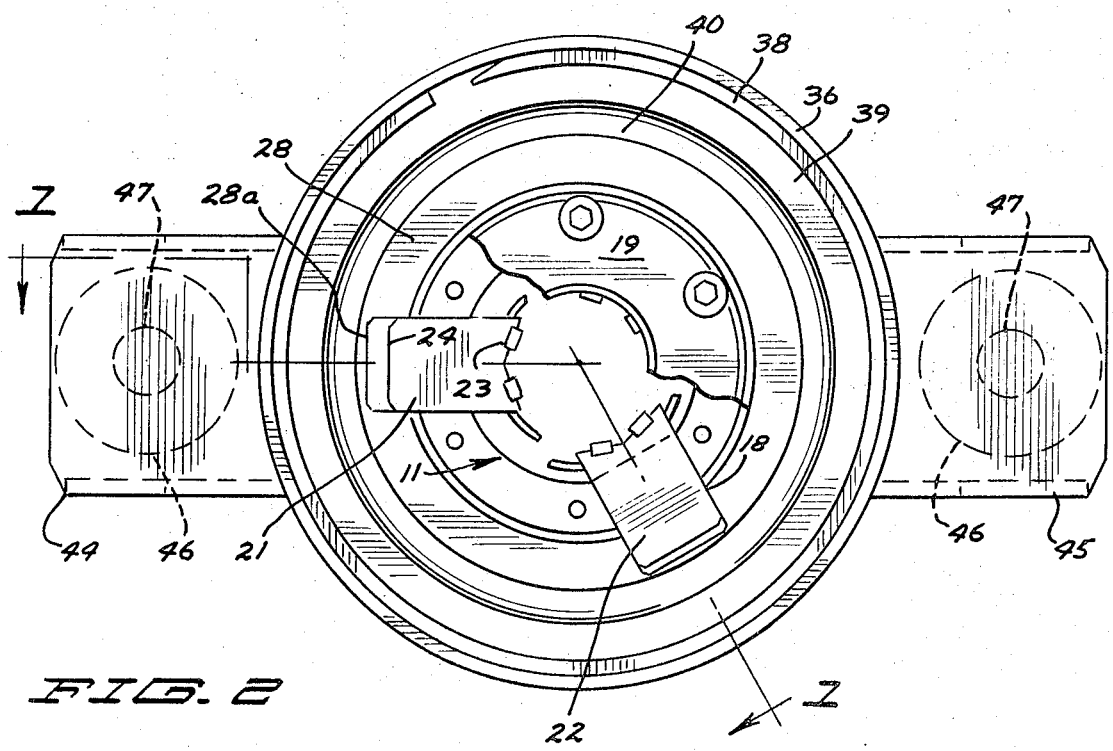
FIG. 2 is a bottom view of the apparatus of this invention, the retainer plate being partially broken away and one of the jaws being shown in a drill rod release position and the other being shown in a drill rod clamping position.

The lower end of the chuck body portion is provided with a plurality of angularly spaced jaw slots 18 that open through the drive spindle to the interior thereof. Although the slots can be formed to have lower edges terminating above the lower terminal angular edge of the drive spindle, preferably the slots open axially downwardly through the lower angular edge and a retainer ring 19 is bolted to the lower end of the drive spindle to provide a wall defining the lower edges of the slots as shown in FIG. 1. Also, even though a different number of jaws and jaw slots may be provided, the embodiment of the invention illustrated has three jaw slots and a jaw in each slot, the jaw 21 being shown in a rod clamping position and 22 being shown in a rod release position. Advantageously, each jaw may have a number of hardened inserts 23. Further, each jaw has a radially outward ramp surface 24 that is tapered upwardly and radially inwardly toward the central axis L—L of the drive spindle and an arcuately curved, downwardly facing shoulder 26 abuttable against the retainer ring 19 to aid in limiting the radial inward movement of the jaws.

An annular jaw actuator 28 is mounted on the chuck body portion of the drive spindle for free axial slidable movement relative thereto, an upwardly facing shoulder 28a being provided on the outer circumferential portion of the actuator a substantial distance below the top annular edge of the actuator to have the inner race of the bearing 30 bear thereagainst. A retainer clip 31 is mounted in a groove in the outer circumferential portion of the actuator to retain an annular spacer 32 in abutting relationship with the top surface of the inner race of the bearing. An annular seal 34 is provided between the annular seal mount 35 and a spacer 32, the seal mount being mounted by the upper portion of the chuck housing 36.

The upper end portion of the chuck housing has a radially inward, downwardly facing shoulder 36a for bearing against the outer race of the bearing 30, the chuck housing and jaw actuator cooperatively mounting the bearing to permit the jaw actuator rotating relative the chuck housing. The lower edge portion of the chuck housing has an inner peripheral groove that mounts a retainer clip 38 which in turn supports a seal mount 39. An O-ring is provided between the seal mount 39 and the inner peripheral wall of the housing 36, while the seal mount mounts an annular seal 40 that abuts against the lower outer edge portion of the jaw actuator. A retainer ring 41 is supported by the seal mount 39 to abut against the radial outer, downwardly facing shoulder 43 of the jaw actuator. Thus members 38, 39 and 41 serve to rotatably support the jaw actuator and prevent the jaw actuator moving axially downwardly relative the chuck body housing while members 30, 32 and 31 serve to prevent the jaw actuator moving axially upwardly relative the chuck housing.

The actuator has a radially inward notch 28a for each jaw that is radially opposite the respective jaw for receiving the radial outer portion of the jaw when the actuator is in a jaw rod release position. Each notch 28a has a ramp surface of an opposite taper from that of the ramp surface 24 of the respective jaw, the notches terminating a substantial distance below the top annular edge of the actuator and extending downwardly to open through the lower annular edge of the actuator. The inner surface of the actuator above the notches is annular and of a diameter to form a close sliding fit with the chuck body portion while the arcuate inner surface portions of the actuator between the notches also are of radii to form a close sliding fit with chuck body portion.

Mounted on diametrically opposite sides of the chuck housing 36 to extend radially outwardly therefrom are brackets 44, 45 respectively. Threadedly secured to the web portion of each of the brackets is a piston rod 47 of a two-way piston cylinder combination that includes a cylinder 46 bolted to the drill head housing to depend therefrom. Upon applying air under pressure to the one ends of the cylinders, the brackets, the chuck body housing and the jaw actuator are moved axially toward the drill head housing while upon applying air under pressure to opposite ends of the cylinders, the brackets and jaw actuator are moved axially away from the drill head housing. In order to retain the ramp surfaces of the jaws in abutting relationship with the ramp surfaces of the jaw actuator as the jaw actuator is moved toward the housing, there are provided upper and lower springs 48 that extend in arcuate grooves formed in the inner peripheral wall portions of the jaws.

With the present invention, most of the downward force exerted on the drill rod 50, when clamped by the jaws, is exerted downwardly from the drill head housing, through the piston cylinder combinations, then through the chuck housing, and thence through the bearing 30 to the jaw actuator. The above is in contrast to conventional chuck mechanism wherein most of the downward force is exerted on the drive spindle to the jaws.

The bearing 30 permits the jaw actuator to rotate with the drive spindle relative the chuck housing even though the downward force is exerted through the housing to the actuator. Further, with this invention, the jaws may be readily replaced as only the retainer ring has to be removed and then the jaws can be moved axially downwardly from the drive spindle.

What is claimed is:

1. Chuck apparatus dependingly mounted on a drive housing for clampingly engaging a drill rod or the like comprising a tubular vertical drive member rotatably extending in the housing and having a lower chuck body portion extending axially below said housing, said chuck body portion having a jaw receiving slot extending generally radially therethrough, a jaw mounted in the slot for radial movement, annular jaw actuating first means on the chuck body portion for axial movement relative thereto to move the jaw radially relative the chuck body portion between a rod release position and a rod clamping position, said jaw and actuating means having cooperating ramp surfaces for moving the jaw radially inwardly relative the chuck body portion to the jaw rod clamping position as the actuating means is moved away from the drive housing, second means mounting the actuating means for rotary movement relative thereto and moving the actuating means axially relative the chuck body portion, and power means mounted on the housing for mounting the second means and selectively moving the second means axially to move the actuating means between a jaw rod clamping position and a jaw rod release position.

2. The apparatus of claim 1 further characterized in that the second means comprises a chuck housing and third means mounted by the chuck housing for mounting the actuating means for rotary movement relative thereto and in fixed axial relationship thereto.

3. The apparatus of claim 2 further characterized in that the power means includes a piston cylinder combination having a piston rod and cylinder and a bracket secured to the chuck housing to extend radially outwardly therefrom, the piston rod being secured to one of the bracket and the drive housing and the cylinder being secured to the other.

4. The apparatus of claim 2 further characterized in that the actuating means has an upwardly facing shoulder, that the chuck housing has a downwardly facing shoulder and that the third means comprises a bearing between said shoulders for transmitting a downward force from the chuck housing to the actuating means.

5. The apparatus of claim 4 further characterized in that the chuck housing is annular, that the actuating means has a downwardly facing shoulder, and that the third means comprises annular means mounted on the chuck housing and bearing against the actuating means downwardly facing shoulder to support the actuating means and block axial downward movement of the actuating means relative the chuck housing.

6. Chuck apparatus mounted on a drill head housing for clampingly engaging a drill rod or the like comprising a tubular drive spindle extending rotatably within the drill head housing and axially away therefrom, said drive spindle having a chuck body portion extending axially outwardly of the drill head housing, said chuck body portion having a jaw receiving slot extending generally radially therethrough, a jaw mounted in the slot for radial movement between a drill rod clamping position and a drill rod release position, annular jaw actuating first means freely axially slidably movable on and relative chuck body portion for moving the jaw radially inwardly to the drill rod clamping position and being movable relative the chuck body portion to a jaw rod release position, said jaw and actuating means having cooperating ramp surfaces for moving the jaw radially inwardly relative the body portion as the actuating means is moved away from the drill head housing, an annular chuck housing surrounding the actuating means, second means for mounting the actuating means on the chuck housing for rotary movement relative thereto and moving the actuating means with the chuck housing, said second means including bearing means for transmitting a force from the chuck housing to the actuating means to move the actuating means away from the drill head housing when the chuck housing is moved in the same direction, said actuating means and chuck housing having cooperating shoulders for mounting the bearing means for transmitting said force, and third means mounted on the drill head housing for mounting the chuck housing and selectively move the chuck housing to move the actuating means between the jaw rod clamping position and the release position.

7. The apparatus of claim 6 further characterized in that said third means includes a piston cylinder combination.

8. The apparatus of claim 6 further characterized in that the actuating means has an end portion remote from the drill head housing that has a shoulder facing away from the drill head housing, and that the second means includes means mounted by the chuck housing and bearing against the last mentioned shoulder for moving the actuating means toward the jaw rod release position when the chuck housing is moved toward the drill head housing.

9. The apparatus of claim 8 further characterized in that there is provided means for resiliently urging the jaw toward its release position, that the third means includes a pair of spaced piston cylinder combinations that dependingly mount the chuck housing from the drill head housing and selectively reciprocally move the chuck housing toward and away from the drill head housing.

10. The apparatus of claim 9 further characterized in that the chuck body portion has a terminal edge remote from the drill head housing, and at least three jaw slots, said jaw slots opening to the terminal edge, that there is a jaw for each of said slots, and that a retainer ring is bolted to the chuck body portion to aid in retaining the jaws in the slots while permitting the jaws moving radially.

* * * * *